106. COMPOSITIONS,
COATING OR PLASTIC

Patented Dec. 2, 1941

2,264,336

UNITED STATES PATENT OFFICE 2,264,336

INDURATING COMPOSITION FOR CONCRETE

Edward W. Scripture, Jr., Shaker Heights, Ohio

No Drawing. Application October 16, 1939,
Serial No. 299,696

23 Claims. (Cl. 106—90)

This invention relates to indurating compositions for improving hydraulic cement mixes, such as used for the making of mortar, concrete, and the like.

Concrete and mortar are structural materials manufactured during construction operations by mixing together an hydraulic cement and aggregates with sufficient water to form a plastic mass which can be placed in the space to be filled and compacted therein. It is necessary that this structural material shall have certain properties, such as a certain strength, low volume change, relative water tightness or impermeability, etc.

The concrete or mortar hardens and acquires strength through a reaction which is primarily an hydration of the cement compounds, but is more or less complex, between the water and the cement. It is, however, never possible to make a plastic placeable concrete with only sufficient water to hydrate the cement; an excess of water is always required. It is upon the amount of this excess of water that the properties of the concrete are largely dependent. The compressive strength varies inversely with the proportion of the water to the mix. The changes in volume are to a large extent dependent on the amount of excess water. When the excess water leaves the concrete subsequent to hardening, it leaves behind it voids which permit the penetration of water and other liquids.

It may be said that the quality of a concrete or mortar is determined by two properties on which the other properties are dependent. These two properties are the amount of excess water in the concrete and the strength, usually determined in compression. It is perfectly possible to diminish the amount of excess water without increasing the strength, and, in fact, with substantial decreases in strength, or even complete destruction of the strength. This results from the fact that many substances which have a plasticizing action on cement mixes, that is, produce a higher degree of plasticity for the same water content or permit a reduction in water for a given plasticity, also interfere with the hydration reactions of the cement. Substances which tend to impair the compressive strength of hydraulic cements obviously should not be used in sufficient amounts in cement mixes to substantially reduce the compressive strength of the structures produced.

It is also perfectly possible to increase the strength of concrete without materially affecting the amount of excess water required for workability. This may be accomplished with various substances which actually react with the cement, such as a pozzuolanic material, or with substances which may be regarded as catalysts, that is, substances which may or may not actually take part in the cement reactions, but which produce effects disproportionately large when compared with the relative amounts of the added substances and the cement. Substances which increase strength without affecting water content of the concrete or mortar are obviously of some utility, since one of the two fundamental properties of the mass is improved. Substances which increase strength, and at the same time increase the water requirements of the concrete, may or may not be useful, depending on the relative importance of strength and water content when the concrete is used for a particular purpose. It will be apparent that the most desirable addition to a concrete or mortar mix is one which will reduce the amount of water required for placeability and at the same time increase the compressive strength.

It has been found that cement dispersing agents will reduce the water required in a cement mix for a given workability. Certain other compounds which are not actually dispersing agents have similar effects, and these may be designated as cement plasticizing agents. Many of the agents known to have cement plasticizing properties tend to decrease the strength of the cement or concrete and, therefore, are not desirable for practical use with hydraulic cement mixes. These cement dispersing or plasticizing agents are generally specific in nature, and the range of their utility is strictly limited. Specificity is manifested, in that dispersing agents, like emulsifying agents, function only with respect to a particular system. That a particular compound is a dispersing agent for a dyestuff by no means indicates that it is a dispersing agent for cement. A considerable number of specific materials is known, however, which materials are cement dispersing agents, and among these may be mentioned saponins and certain sulphonic acid derivatives of polynuclear alkylated hydrocarbons, but there is no means of predicting whether or not any particular material is a cement dispersing agent; this can only be determined by actual experimentation.

It has been pointed out that the useful range of a material which is actually a cement dispersing agent is usually strictly limited. This results, in the first place, from the fact that with increasing proportions of dispersing agent the dispersing effect is enhanced, but beyond a certain proportion, which will vary for each dispersing agent, no further effect is produced, or, at least, the further effects are small and not commensurate with the required additions of dispersing agent. Furthermore, with most, and probably all, cement dispersing agents the strength is impaired when amounts in excess of a certain maximum, which also varies for different reagents, are used.

It will be apparent that if, for a given cement content per cubic yard of concrete, it is possible to increase the strength by the addition of a small amount of a material such as a dispersing agent, then for a given strength it will be possible to decrease the cement content per cubic yard. If, at the same time, it is possible to maintain the water content per cubic yard, or to reduce it, then certain advantages will accrue. The concrete with the reduced cement content will have the same compressive strength, and this will be the strength required for the particular purpose for which the original concrete was designed. Furthermore, the volume changes of the concrete will be less, since these are dependent on the volume of cement paste, cement plus water, per cubic yard. Again the watertightness of the structure will be improved and the durability will be increased. Finally, the concrete may be more economical, if the cost of the material or materials added to produce these results is less than the cost of the amount of cement by which the cement content of the concrete is reduced.

It has been found that waste sulphite liquor, either in the form of a liquid or as the dried residue derived from the liquor, is an effective and efficient cement dispersing agent. Waste sulphite liquor is the liquor derived from the treatment of wood to produce a pulp for the manufacture of paper by the sulphite process.

It has been determined that the constituents of waste sulphite liquor in the amounts of 0.01 per cent to 0.30 per cent of the weight of the cement may be added to a concrete or mortar mix with beneficial results, in that the workability for a given water content is increased, or that the water content for a given workability is reduced. And this may be accomplished while either increasing or maintaining the strength. While the constituents of waste sulphite liquor are beneficial even below the amount of .05% by weight of the cement, the effect is comparatively small and it is desirable to use .05% or more of the material. In the higher percentages of this range, however, and with percentages above 0.3 percent of the weight of the cement, the waste sulphite liquor has a tendency to retard the setting of the cement, to retard the rate of hardening, so that strengths at the early ages are lower than would otherwise be the case, and even in some cases to impair the strengths at later ages, even though these larger percentages of waste sulphite liquor are substantially more effective in increasing workability or decreasing water. It has been found, however, that these difficulties may be overcome by the use of a suitable accelerating agent in the proper proportions. When an accelerator is used the amount of the dispersing agent may be increased with consequent increase in the plasticity of the mix and the ultimate strength of the concrete produced. The useful range of a dispersing agent such as waste sulphite liquor is, by this means, extended to 0.5 percent of the dry residue on the weight of the cement, and the usual range for the accelerator is 0.5 percent to 2.5 percent.

My prior patents, Nos. 2,081,642; 2,169,980, and 2,127,451, among others, disclose the use of waste sulphite liquor alone and with other ingredients in hydraulic cement mixes.

By use of the waste sulphite liquor alone, or with an accelerating agent, the properties of concrete are markedly improved without change in the cement content of the concrete. By reducing the cement content while maintaining the same or lower water content, it is also possible to secure concrete of the same compressive strength, but improved with respect to other properties. Unfortunately, while it is possible, in some cases, to reduce the cement content sufficiently to compensate for the cost of the added materials, in many cases the value of the cement saved is less than the cost of the added materials. Although the improvement in the properties of the concrete fully justifies the added expenditure, it will be obvious that it would be preferable if these improvements could be secured at no additional cost, or at a saving.

It is generally accepted that the compressive strength of cement mixes is governed by the so-called "water-cement ratio law," which states that, for workable mixes the compressive strength varies inversely with the ratio of the volume of water used to the volume of cement used (W/C). It is owing to this law, at least in large part, that cement dispersing agents, not in themselves deleterious to the cement, which permit a reduction in water for a given quantity of cement, produce corresponding increases in strength.

If it were possible to increase the compressive strength of the concrete or mortar without reference to the water-cement ratio law, that is, if, for a given cement content and a given water content, the strength could be increased by the addition of some material, then again it might be possible to derive an economic advantage. It might be that the cost of the added material would be less than the value of the cement which could be saved while still producing the same strength. In such a case, however, when a material was used to increase strength, but without reduction in water, the quality of the concrete would not be improved at the reduced cement content, and might even be impaired. The water-cement ratio would be increased, the volume change would not be materially reduced, if reduced at all, and the mix would be deficient in fine material, and might well become harsh and difficultly placeable, even though the consistency were maintained the same.

When, however, a material which increases compressive strength is combined with a material, such as a dispersing agent, which permits a reduction in water while maintaining workability, then the situation may be altered and an unexpected result secured. With the combination of a cement dispersing agent and a strength increasing agent, the cement content of the concrete can be reduced to a point at which the compressive strength is just equal to that of the original mix. With this reduction in cement the properties of the concrete such as volume change, watertightness, durability, etc. are improved and at the same time the workability of the mix is maintained or increased.

With respect to early ages, a number of materials are known which will increase compressive strength. These materials are known as accelerators, that is, they increase the rate of hydration of the cement and its rate of hardening. Such materials do not, however, affect the strength of the completely hydrated cement so that at the later ages the compressive strengths either are not increased or are decreased. Since the ultimate strength or strength at the later ages is the criterion of the value of concrete or mortar for structural purposes, these accelerators do not offer a solution to the problem of increased strength although they may serve other useful purposes such as that noted above or in facilitating construction and increasing the rate of building.

It is also well known that certain materials, for example, pozzuolanas, will increase ultimate strength or strength at later ages. This effect is produced by a chemical reaction between a part of the cement and the pozzuolana forming additional cementitious compounds. The use of these materials suffers from one disadvantage which may be mentioned, and there may be others. The introduction of sufficient pozzuolana into a mix to produce an appreciable increase in strength necessitates the addition of a greater or less amount of water to maintain the same placeable consistency. This obviously decreases the advantages secured by a reduction in water with a cement dispersing agent or otherwise, to a greater or less extent.

Few, if any, substances are known which function in cement mixes with respect to strength at the later ages in a manner similar to the functioning of accelerators with respect to early strengths. Put in another way, few, if any, materials are known which act as catalysts with respect to the strength of cement at the later ages, that is, produce large increases in strength with very small amounts of the added material.

It is an object of the present invention to provide an indurating composition which will increase the strength, hardness, and water-resisting qualities of hydraulic cement structures, and which will also improve the plasticity of the cement mixes.

It is another object of this invention to provide an indurating composition which will increase the density and water-resisting qualities of concrete having a dispersing agent admixed therewith.

It is still another object of this invention to provide an indurating composition which will improve the properties of concrete, mortar, and the like, made from hydraulic cement mixes containing pozzuolanic materials, accelerating agents, dispersing agents, in suitable amounts.

A further object of this invention is to provide an indurating composition which improves the strength of concrete at later ages.

I have found that certain organic compounds function to increase the strength of concrete mortars and the like. Organic compounds containing the grouping

where R is a member of the group consisting of metals, ammonium, organic radicals, and hydrogen, and X is a member of the group consisting of functional groups, derivatives thereof, and nonfunctional groups, when utilized in suitable, relatively small percentages on the weight of the cement, generally have the effect of substantially increasing the compressive strength of hydraulic cement mixes at 28 days or longer.

Among such compounds the salicylates and derivatives thereof appear to be particularly effective. Examples of these are:

(a) The metal salicylates, including salicylates of the alkali metals, the alkaline earth metals, mercury, bismuth, and others.

(b) Examples of other compounds which contain the salicylate grouping and which are effective are: Salicylic acid, acetylsalicylic acid, sulphosalicylic acid and caffeine-salicylic acid.

Other very effective compounds are the substituted benzoic acids and derivatives thereof. Examples of these are: hydroxy benzoic acids; nitro-benzoic acids; aminobenzoic acids; methyl amino benzoic acid, such as methyl salicylate and benzene dicarboxylic acids, such as phthalic acid, etc.

It may be noted that the substituted groups may be in positions ortho, meta, or para to the carbonyl. Other groups may also be substituted in the benzene nucleus without harming the effectiveness of the compounds. Thus, sulpho-salicylic acid, which is a sulphonated salicylic acid, is a very effective material.

Tests were made of various salicylate compounds by making up mortars of one part cement to three parts sand with and without the addition of a small amount of the compound to be tested, using sufficient water in each case to bring the mortars under comparison to the same consistency. Specimens in the form of 2" x 4" cylinders were made, cured for 28 days under standard conditions, and broken in a compression testing machine according to standard procedures. Examples of some of the results secured with some of the compounds tested were as follows:

|  | Compound added | Compressive strength at 28 days |
|---|---|---|
|  |  | Lbs. per sq. inch |
| Series 1 | None | 5,884 |
|  | 0.1 percent methyl salicylate | 6,011 |
|  | 0.1 percent salicylic acid | 6,584 |
| Series 2 | None | 6,360 |
|  | 0.1% calcium salicylate | 7,156 |
|  | 0.1% magnesium salicylate | 6,647 |
|  | 0.1% lithium salicylate | 6,616 |
| Series 3 | None | 6,392 |
|  | 0.1% mercury salicylate | 6,616 |
|  | 0.1% sodium salicylate | 6,742 |
|  | 0.1% bismuth sub-salicylate | 7,474 |
| Series 4 | None | 6,392 |
|  | 0.1% acetyl salicylic acid | 7,028 |
|  | 0.1% sulpho salicylic acid | 7,156 |
|  | 0.1% caffein sodio-salicylate | 7,283 |

I have also carried out experiments which show that the amount of salicylate compound to be added should lie within a specific range based on the weight of the cement. Below a certain percentage the salicylate compound has no beneficial effect or its effect is inappreciable and above a certain percentage the beneficial effect decreases until it has become completely lost and a deleterious effect has actually been produced.

For example, the limits of the lower range are illustrated by the results of the following series of tests conducted in the manner previously described:

| Compound added | Compressive strength at 28 days |
|---|---|
|  | Lbs. per sq. inch |
| None | 5,852 |
| .01% salicylic acid | 5,948 |
| .03% salicylic acid | 6,266 |
| .10% salicylic acid | 6,266 |
| .20% salicylic acid | 6,329 |

It will be clear that in this series the increase in strength at 28 days with less than .01% of salicylic acid is not substantial but that with larger additions the effect becomes greater.

As an example of the upper limits of the range a second similar series of tests gave results as follows:

| Compound added | Compressive strength at 28 days |
|---|---|
| | Lbs. per sq. inch |
| None | 6,202 |
| 0.20% salicylic acid | 6,552 |
| 0.30% salicylic acid | 7,028 |
| 0.40% salicylic acid | 6,934 |
| 0.50% salicylic acid | 6,042 |
| 1.00% salicylic acid | 5,852 |

It will be seen from this series that from 0.2% of salicylic acid on the weight of the cement the effect on the compressive strength is increasingly beneficial up to about 0.3%. At 0.4% a substantial beneficial effect is still derived although the effect of this percentage is no greater than that of 0.3% and in fact slightly less. At 0.5% of salicylic acid the beneficial effect of the addition has been entirely lost and in fact an actual small decrease has been produced. With 1.0% of salicylic acid the 28 day strength has been definitely impaired.

Many compounds which are substituted benzoic acids, or the derivatives thereof, may be used in the cement mix under different conditions, and for different purposes. As mentioned above, the desirable range for salicylic acid and the salicylates is from about .01% to .5% of the compound by weight of the cement. For the other compounds mentioned it may be desirable to depart from the precise limits of this range. However, it is usually desirable to have any compound present in an amount of .01% or more, in order to obtain the beneficial effect of it, and, when used in a percentage above about .3% to .5%, or so, the strength of the cement is usually decreased.

I have found, furthermore, that remarkably large increases in strength may be produced with a mixture composed of the dried residue of waste sulphite liquor and a substituted benzoic acid or derivative thereof, such as salicylic acid. This is illustrated by the following examples and tests which were made in the manner described previously.

COMPOSITION A

| | Parts |
|---|---|
| Dried waste sulphite liquor | 80 |
| Salicylic acid | 20 |

| Material added | Compressive strength, lbs. per sq. in. | | | |
|---|---|---|---|---|
| | 1 day | 3 days | 7 days | 28 days |
| None | 572 | 2,226 | 4,040 | 5,948 |
| Composition A—0.25% | 636 | 2,672 | 4,390 | 6,870 |

This result is all the more surprising in that the strength at one day, which is decreased by the use of waste sulphite liquor alone, is increased by the combination of waste sulphite liquor and salicylic acid, whereas salicylic acid alone does not appear to increase compressive strength at the early ages as is seen in the following test:

| Material added | Compressive strength, lbs. per sq. in. | | |
|---|---|---|---|
| | 1 day | 3 days | 7 days |
| None | 1,337 | 3,054 | 5,566 |
| .1% salicylic acid | 1,369 | 3,086 | 5,375 |
| .3% waste sulphite liquor residue | 860 | 2,640 | 5,184 |

It is also possible to include in a composition for use in concrete or mortar mixes an accelerator and a pozzuolanic material and I have obtained some remarkable results with combinations of these materials. It is possible to use many accelerators, such as the soluble metal chlorides, including calcium, aluminum, and ammonium. Also, alkali metal hydroxides, silicates, and aluminates may be used. Calcium chloride is a very satisfactory accelerator and is readily available. The amount of accelerator used is preferably from about .5% to 2.5% by weight of the cement.

Examples of the compositions which I have employed are:

EXAMPLE 1

COMPOSITION B

| | Parts |
|---|---|
| Waste sulphite liquor residue | 30 |
| Salicylic acid | 10 |
| Calcium chloride | 60 |

EXAMPLE 2

COMPOSITION C

| | Parts |
|---|---|
| Waste sulphite liquor residue | 30 |
| Salicylic acid | 10 |
| Calcium chloride | 50 |
| Fly ash | 10 |

EXAMPLE 3

COMPOSITION D

| | Parts |
|---|---|
| Waste sulphite liquor | 30 |
| Salicylic acid | 7½ |
| Calcium chloride | 60 |
| Fly ash | 2½ |

For instance, with Composition B of Example 1, I have made tests in the manner previously described with the following results:

| Addition to mortar | Compressive strength, lbs. per sq. in. | | |
|---|---|---|---|
| | 3 days | 7 days | 14 days |
| None | 2,800 | 4,962 | 5,566 |
| 1% Composition B | 3,562 | 5,852 | 7,470 |

Again with the Composition C of Example 2, I have made similar tests with the following results:

| Addition to mortar | Compressive strength, lbs. per sq. in. | | |
|---|---|---|---|
| | 3 days | 7 days | 14 days |
| None | 2,862 | 4,770 | 6,170 |
| 1% Composition C | 3,785 | 5,344 | 7,092 |

I have also made extensive tests with Composition C of Example 2 in concrete mixes with very remarkable results, but I will give as an example the results with a series of concrete mixes with varying cement content using Composition D of Example 3.

In these tests concrete mixes comprising cement, sand, limestone of ¾" maximum size and water were made up with and without using Composition D. The mixes were made up in a concrete mixer with sufficient water to produce approximately the same consistency or slump, of from 3" to 4". From each 6" x 12" cylindrical specimens were made, cured under standard conditions and broken at ages of 3, 7, and 28 days, all according to standard procedures. The cement content was varied in the mixes without Composition D from 375 lbs. per cubic yard to 675 lbs. per cubic yard and in the mixes with Composition D from 300 lbs. per cubic yard to 600 lbs. per cubic yard. The results of these tests were as follows:

|  | Mix No. | | | | |
| --- | --- | --- | --- | --- | --- |
|  | 1 | 2 | 3 | 4 | 5 |
| Cement........pounds.. | 25 | 30 | 35 | 40 | 45 |
| Sand............do.... | 96 | 90 | 84 | 78 | 72 |
| Limestone........do.... | 133 | 133 | 133 | 133 | 133 |
| Water...........do.... | 21¾₁₆ | 19¹³⁄₁₆ | 21¾₁₆ | 20⅝₁₆ | 20⅝₁₆ |

|  | Mix No. | | | | |
| --- | --- | --- | --- | --- | --- |
|  | 6 | 7 | 8 | 9 | 10 |
| Cement........pounds.. | 20 | 25 | 30 | 35 | 40 |
| Sand............do.... | 102 | 96 | 90 | 84 | 78 |
| Limestone........do.... | 133 | 133 | 133 | 133 | 113 |
| Composition D..grams. | 97 | 121 | 145 | 169 | 194 |
| Water.........pounds.. | 18¾₁₆ | 18⅞₁₆ | 17⅝₁₆ | 17¾ | 17¹³⁄₁₆ |

*Compressive strength, lbs. per sq. in.*

|  | Mix No. | | | | |
| --- | --- | --- | --- | --- | --- |
|  | 1 | 2 | 3 | 4 | 5 |
| 3 days............ | 990 | 1,700 | 1,880 | 2,940 | 3,270 |
| 7 days............ | 1,650 | 2,990 | 3,010 | 4,500 | 4,650 |
| 28 days........... | 2,190 | 3,860 | 4,040 | 5,225 | 5,400 |

|  | Mix No. | | | | |
| --- | --- | --- | --- | --- | --- |
|  | 6 | 7 | 8 | 9 | 10 |
| 3 days............ | 1,010 | 1,660 | 2,750 | 3,540 | 4,610 |
| 7 days............ | 1,630 | 2,420 | 3,710 | 4,640 | 5,000 |
| 28 days........... | 2,300 | 3,680 | 5,090 | 5,710 | 7,040 |

It will be seen that at equal cement content, for example, Mixes Nos. 2 and 8 with 450 lbs. per cu. yd., the compressive strengths at all ages are very much higher in the mix in which the composition of my invention has been employed. At the same time the water has been markedly reduced; Mix No. 2 contains 35¾ gals. per cubic yard, whereas Mix No. 8 contains only 31½ gals. The same is true when any pair of mixes at the same cement content is considered.

Moreover, if mixes at approximately the same compressive strength are considered it will be seen that those containing the composition of my invention require much less cement. For instance, Mix No. 1 with 375 lbs. cement per cubic yard has about the same strength as Mix No. 6 with 300 lbs. per cubic yard, and Mix No. 6 contains about 5½ gals. less water than Mix No. 1.

Or again, Mix No. 8 which contains the composition has about the same strength as Mix No. 4. In the first 450 lbs. cement per cubic yard were used and in the second 600 lbs. cement per cubic yard. The second contains about 5 gals. per cubic yard less water than the first. It will be apparent that approximately the same strength may be produced with the Composition D of my invention with substantial reduction in the cement content of the concrete and also with less water. The reduction in cement content which is possible will vary with the cement content of the original mix and is naturally larger for mixes of higher cement content. For example, in the first case cited above the cement content may be reduced about 75 or 80 lbs. per cubic yard from an original cement content of 375 lbs., and in the second case about 140 lbs. from an original content of 600 lbs., or between 20% and 25% in all cases.

While it has been possible to reduce cement content by the use of cement plasticizing agents and to improve the properties of concrete, it has not heretofore been possible to produce results of this magnitude. As a consequence, with the effects hitherto produced it has not been possible to secure any substantial savings in cost, and in many or most cases it has been necessary to add to the cost of the concrete when using the cement dispersing agent. On the other hand, with the compositions of my invention it has been possible to effect much larger reductions in the cement required for a given compressive strength so that in most cases and probably all it is possible to make more or less substantial savings in the cost of the concrete.

In this connection it may again be pointed out that the desired results would not be secured by the use of a salicylate derivative alone, since although these compounds increase ultimate strength, they do not materially improve workability and consequently do not permit reductions in the cement content. It is necessary, in order to derive the full benefits of my invention, to employ in conjunction with the salicylate a cement dispersing agent and for this purpose I have found the solids contained in waste sulphite liquor to be most effective and economical. Furthermore, in order to realize the full advantage of the cement dispersing agent and to prevent slow hardening and low strengths at the early ages, I find it desirable to use in my composition an accelerating agent. Finally I find that the inclusion of a finely divided material, which may or may not be pozzuolanic, is often desirable for several purposes. A pozzuolanic material increases durability, particularly resistance to corrosion and any finely divided material will supply deficiencies or fines in the concrete mix such as occurs with many aggregates and especially in mixes of reduced cement content.

While I have chosen to illustrate this invention by compositions containing salicylic acid and salicylates, which are very effective in the production of hydraulic cement structures, it is understood that substantially equal, or in some cases superior, results may be obtained when the salicylic acid or salicylate compounds are substituted by a similar relatively small quantity of any of compounds having the structure previously mentioned.

The compositions of my invention may be used alone or in conjunction with other materials which are commonly added to concrete or mortar mixes for one purpose or another. These include pigments which are added to color the concrete, water-repellent materials such as stearates, waxes, paraffin, etc. which are added for the purpose of waterproofing metallic aggregates or special hard aggregates such as silicon carbide which are used to produce wear resisting surfaces, finely divided materials such as diatomaceous earth, talc, pumice, fly ash, etc. which may or may not be pozzuolanic and which are added either as fillers or to improve the durability of concrete, and accelerators or retarders such as calcium chloride or calcium sulphate which are added to promote either rapid or slow hardening as may be required for particular types of construction.

The compositions of my invention may be added to the cement, to the aggregate, to the water or to any other part of the mix prior to mixing or during mixing, or they may be added to the entire mix at any time prior to completion of the mixing. Furthermore, these compositions may be added to the cement or ground with the cement at the time of manufacture of the cement.

The waste sulphite liquor may be used in the form of a liquid containing more or less water, or in the form of a dry residue derived from the liquid. The other ingredients may be added in the dry form, or, if preferable, water may be added to form a paste, or in sufficient quantity to make the composition substantially a liquid.

Furthermore, it will be apparent that the ingredients of my compositions may be added to the concrete mix combined as a whole or each ingredient may be added separately to the same or different parts of the concrete mix at the same time or at different times or each ingredient may be added separately to the whole concrete mix.

As may be seen from the above, the present invention relates to structural concrete, that is, concrete in which the hydraulic or inorganic cement is the sole or principal binding agent as distinguished from compositions having aggregate bound together by glue, rubber, latex and other organic materials.

Furthermore, it is to be understood that the particular compounds disclosed, and the procedure set forth, are presented for the purposes of explanation and illustration, and that various equivalents can be used and modifications of said procedure can be made without departing from my invention as defined in the appended claims.

What I claim is:

1. An indurating composition for concrete or mortar, comprising an accelerator which increases the rate of hardening of the cement, a compound containing the grouping.

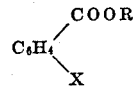

where X is a member of the group consisting of functional groups, derivatives thereof, and non-functional groups, and R is a member of the group consisting of metals, ammonium, organic radicals, and hydrogen, and the organic constituents of waste sulphite liquor:

2. An indurating composition for concrete or mortar, comprising the organic constituents of waste sulphite liquor and a compound containing the salicylate group.

3. An indurating composition for concrete or mortar, comprising waste sulphite liquor in an amount equivalent to .05% to .3% of the dried residue by weight of the cement and .01% to .5% of a compound containing the grouping

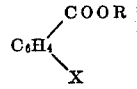

where X is a member of the group consisting of functional groups, derivatives thereof, and non-functional groups, and R is a member of the group consisting of metals, ammonium, organic radicals, and hydrogen.

4. An indurating composition for concrete or mortar, comprising waste sulphite liquor in an amount equivalent to .05% to .3% of the dried residue by weight of the cement, .01% to .5% of a compound containing the grouping

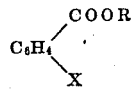

where X is a member of the group consisting of functional groups, derivatives thereof, and non-functional groups, and R is a member of the group consisting of metals, ammonium, organic radicals, and hydrogen and an accelerator which increases the rate of hardening of the cement, said accelerator being one of the group including water soluble metal chlorides.

5. An indurating composition for concrete or mortar, comprising waste sulphite liquor in an amount equivalent to .05% to .3% of the dried residue by weight of the cement and .01% to .5% of a compound containing the salicylate group.

6. An indurating composition for concrete or mortar, comprising salicylic acid, organic constituents of waste sulphite liquor, and calcium chloride.

7. An indurating composition for concrete or mortar, comprising organic constituents of waste sulphite liquor, calcium chloride, and a compound containing the grouping

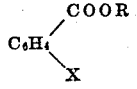

where X is an hydroxyl group and R is a member of the group consisting of metals, ammonium, organic radicals, and hydrogen.

8. A dry cement comprising hydraulic cement which contains a compound having the grouping

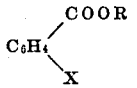

where X is a member of the group consisting of functional groups, derivatives thereof, and non-functional groups, and R is a member of the group consisting of metals, ammonium, organic radicals, and hydrogen, said compound being present in the amount of .01% to .5% of the weight of the cement.

9. A dry cement comprising hydraulic cement, salicylic acid and waste sulphite liquor residue.

10. A dry cement comprising hydraulic cement, an accelerator which increases the rate of hardening of the cement, and a compound having the grouping

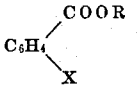

where X is a member of the group consisting of functional groups, derivatives thereof, and non-functional groups, and R is a member of the group consisting of metals, ammonium, organic radicals, and hydrogen, said compound being present in the amount of .01% to .5% of the weight of the cement.

11. A dry cement comprising hydraulic cement which contains a compound having the grouping

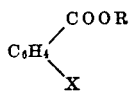

where X is a member of the group consisting of functional groups, derivatives thereof, and non-functional groups, and R is a member of the group consisting of metals, ammonium, organic radicals, and hydrogen, said compound being present in the amount of .01% to .5% of the weight of the cement, and a cement dispersing agent.

12. A structural mortar or concrete mix in which an hydraulic cement constitutes the sole binding medium, comprising a mixture of hydraulic cement and aggregate, and containing a compound having the grouping

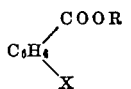

where X is a member of the group consisting of functional groups, derivatives thereof, and non-functional groups, and R is a member of the group consisting of metals, ammonium, organic radicals, and hydrogen, said compound being present in the amount of .01% to .5% of the weight of the cement.

13. A structural mortar or concrete mix in which an hydraulic cement constitutes the sole binding medium, comprising a mixture of hydraulic cement and aggregate, and containing a compound having the grouping

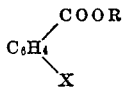

where X is a member of the group consisting of functional groups, derivatives thereof, and non-functional groups, and R is a member of the group consisting of metals, ammonium, organic radicals, and hydrogen, and a cement dispersing agent.

14. A mortar or concrete mix, comprising a mixture of hydraulic cement and aggregate, and containing the organic constituents of waste sulphite liquor and a compound containing the salicylate group.

15. A mortar or concrete mix, comprising a mixture of hydraulic cement and aggregate, and containing the organic constituents of waste sulphite liquor and a compound containing the salicylate group and an accelerator which increases the rate of hardening of the cement, said accelerator being one of the group including water soluble metal chlorides.

16. The process of preparing hydraulic cement concrete or mortar mixes capable of hardening into structural materials which have improved properties and in which an hydraulic cement constitutes the sole binding medium, said process comprising mixing with an hydraulic Portland type cement a compound containing the grouping

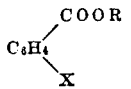

where X is a member of the group consisting of functional groups, derivatives thereof, and non-functional groups, and R is a member of the group consisting of metals, ammonium, organic radicals, and hydrogen, said compound being present in the amount of .01% to .5% of the weight of the cement.

17. The process of preparing hydraulic cement concrete or mortar mixes capable of hardening into structural materials which have improved properties and in which an hydraulic cement constitutes the sole binding medium, said process comprising mixing with an hydraulic Portland type cement a compound containing the grouping

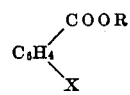

where X is a member of the group consisting of functional groups, derivatives thereof, and non-functional groups, and R is a member of the group consisting of metals, ammonium, organic radicals, and hydrogen, and a cement dispersing agent.

18. The process of preparing concrete or mortar mixes having improved properties, which comprises mixing with an hydraulic cement the organic constituents of waste sulphite liquor in an amount equivalent to .05% to .3% of the dried residue by weight of the cement and .01% to .5% of a compound containing the grouping

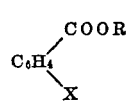

where X is a member of the group consisting of functional groups, derivatives thereof, and non-functional groups, and R is a member of the group consisting of metals, ammonium, organic radicals, and hydrogen.

19. A structural mortar or concrete mix in which an hydraulic cement constitutes the binding medium comprising a mixture of Portland cement and aggregate, and containing the organic constituents of waste sulphite liquor in an amount equivalent to .05% to .3% of the dry residue by weight of the cement, and .01% to .5% of a compound containing the salicylic acid radical.

20. The process of preparing improved hydraulic cement concrete or mortar mixes for structural purposes in which an hydraulic cement constitutes the sole binding medium which comprises mixing with an hydraulic cement an accelerator for increasing the rate of hardening of the cement and a compound containing the grouping

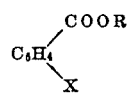

where X is a member of the group consisting of functional groups, derivatives thereof, and non-functional groups, and R is a member of the group consisting of metals, ammonium, organic radicals, and hydrogen, said compound being present in the amount of .01% to .5% of the weight of the cement.

21. A structural hydraulic cement mortar or concrete mix in which an hydraulic cement constitutes the sole binding medium comprising a mixture of hydraulic cement, an accelerator which increases the rate of hardening of the cement, and aggregate, and containing a compound having the grouping

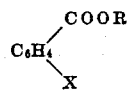

where X is a member of the group consisting of functional groups, derivatives thereof, and non-functional groups, and R is a member of the group consisting of metals, ammonium, organic radicals, and hydrogen, said compound being present in the amount of .01% to .5% of the weight of the cement, said accelerator being one of the group including soluble metal chlorides.

22. A dry cement comprising an hydraulic cement and a member of the salicylate group in the amount of .01% to .5% of the weight of the cement.

23. A dry cement comprising an hydraulic cement, a member of the salicylate group in the amount of .01% to .5% of the weight of the cement, and organic constituents of waste sulphite liquor.

EDWARD W. SCRIPTURE, Jr.